(12) United States Patent
Deffenbaugh et al.

(10) Patent No.: US 7,062,383 B2
(45) Date of Patent: Jun. 13, 2006

(54) METHOD FOR PREDICTING GRAIN SIZE DISTRIBUTION FROM THE SHAPE OF A SEDIMENTARY BODY

(75) Inventors: Max Deffenbaugh, Houston, TX (US); John C. Van Wagoner, Houston, TX (US); Chun Huh, Austin, TX (US); Tao Sun, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 2 days.

(21) Appl. No.: 10/850,018

(22) Filed: May 20, 2004

(65) Prior Publication Data

US 2004/0236511 A1 Nov. 25, 2004

Related U.S. Application Data

(60) Provisional application No. 60/472,884, filed on May 23, 2003.

(51) Int. Cl.
*G01V 9/00* (2006.01)
(52) U.S. Cl. .............................. 702/2; 702/12; 703/10
(58) Field of Classification Search .................. 702/2, 702/6, 11–14, 16, 5; 703/2, 5, 9; 367/73
See application file for complete search history.

(56) References Cited

U.S. PATENT DOCUMENTS 5,563,513 A 10/1996 Tasci et al. ................. 324/359
5,844,799 A 12/1998 Joseph et al. ............... 364/420
6,205,402 B1 3/2001 Lazaar et al. .................. 702/2

OTHER PUBLICATIONS

Begin, Z. B. (1987) "Application of Diffusion-Erosion Model to Alluvial Channels Which Degrade Due to Base-Level Lowering", *Earth Surface Processes and Landforms*, vol. 13, pp. 487-500.

Bitzer, K. (1999) "Two-Dimensional Simulation of Clastic and Carbonate Sedimentation, Consolidation, Subsidence, Fluid Flow, Heat Flow and Solute Transport During the Formation of Sedimentary Basins", *Computers & Geosciences*, vol. 25, pp. 431-447.

Bradford, S. F. and Katopodes, N. D. (1999) "Hydrodynamics of Turbid Underflows. I: Formulation and Numerical Analysis", *J. Hydr. Eng.*, vol. 125, No. 10, pp. 1006-1051.

(Continued)

*Primary Examiner*—Donald McElheny, Jr.
(74) *Attorney, Agent, or Firm*—ExxonMobil Upstream Research Company - Law Department (57) ABSTRACT

The internal properties of a water-lain sediment body can be determined from the shape of the deposit. One method comprises solving equations relating the shape of a sediment body to the flow field that produced the body and using the flow field to solve for the sediment body properties in at least one point within the body. The flow field properties include flow velocity, suspended sediment volume fractions, deposition time, and flow height. The properties of the water-lain sediments include, in addition to the flow properties associated with deposition of the sediments, the thickness of the sediment body, the size of the body, the shape of the body, and the grain size distribution at points within the body.

19 Claims, 3 Drawing Sheets

OTHER PUBLICATIONS

Chaudhry, M. H. (1993) *Open-Channel Flow*, Englewood Cliffs, NJ: Prentice-Hall, contents listing.

Dietrich, W. E. (1982) "Settling Velocity of Natural Particles", *J. Geophys. Res.*, vol. 18, No. 6, pp. 1615-1626.

Garcia, M. and Parker, G. (1991) "Entrainment of Bed Sediment into Suspension", *J. Hydr. Eng.*, vol. 117, No. 4, pp. 414-435.

Garcia, M. (1993) "Experiments on the Entrainment of Sediment Into Suspension by a Dense Bottom Current", *Jrnl. of Geophysical Research*, vol. 98, No. C3, Mar. 15, 1993, pp. 4793-4807.

Hager, W. H. (1996) "Alluvial Channel Geometry: Theory and Applications", *Jrnl. of Hydraulic Engineering*, Dec. 1996, pp. 750.

Huang, H. Q., and Nanson, G.C., (2000) "Hydraulic Geometry and Maximum Flow Efficiency as Products of the Principles of Least Action", *Earth Surf. Process. Landforms*, vol. 25, pp. 1-16.

Imran, J., Parker, G., and Katopedes, N. D. (1998) "A Numerical Model of Channel Inception on Submarine Fans", *J. Geophys. Res.*, vol. 103, No. C1, pp. 1219-1238.

Kenyon, P.M. and Turcotte, D. L.(1985) "Morphology of a Delta Prograding by Bulk Sediment Transport", *Geological Society of America Bullentin*, vol. 96, 14 figs., 2 tables, Nov. 1985, pp. 1457-1465.

Parker, G. Fukushima, Y. and Pantin, H. M. (1986) "Self-Accelerating Turbidity Currents", *J. Fluid Mech.*, vol. 171, pp. 145-181.

Patankar, S.V. (1980) *Numerical Heat Transfer and Fluid Flow*, New York: Hemisphere Publishing, contents pages.

Rivenaes, J. C. (1992) "Application of Dual-Lithology, Depth-Dependent Diffusion Equation in Stratigraphic Simulation", *Basin Research*, vol. 4, pp. 133-146.

European Search Report No. 110155US dated Feb. 18, 2004.

METHOD FOR PREDICTING GRAIN SIZE DISTRIBUTION FROM THE SHAPE OF A SEDIMENTARY BODY

This application claims the benefit of U.S. Provisional Application No. 60/472,884 filed on May 23, 2003.

FIELD OF THE INVENTION

This invention relates generally to the field of geologic modeling. More specifically, the invention is a method for determining the grain size distribution at all points within a sedimentary body from the three-dimensional outline of the body.

BACKGROUND OF THE INVENTION

In the oil and gas industry, seismic prospecting techniques commonly are used to aid in the search for and evaluation of subterranean hydrocarbon reservoirs. A seismic prospecting operation consists of three separate stages: data acquisition, data processing, and data interpretation, and success of the operation depends on satisfactory completion of all three stages.

In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

At present, the conclusions that can be made after the data interpretation stage are generally limited to broad descriptions of the size, shape, and general nature of subsurface structures. These descriptions may, for example, provide an indication of the total volume of hydrocarbons which might be retained in such structures. However, present technology does not allow the analyst to determine preferred locations within a structure for drilling wells, except in a very broad sense. In addition, when an exploration well has been drilled, present technology does not allow an analyst to accurately characterize the nature of the subsurface structure in locations other than the immediate region surrounding the well.

The hydrocarbon volume and rate of production depend on a variety of factors, including the grain size distribution of the sand deposit that makes up the reservoir in which the hydrocarbons are found. There is a need to predict the broad nature of a subsurface structure of interest using only seismic data and a minimal number of exploration wells, preferably without an exploration well. Such a capability would facilitate estimation of hydrocarbon volume in place and production rates early in the hydrocarbon exploration and development process. Accordingly, this invention satisfies that need.

SUMMARY OF THE INVENTION

A method to determine the internal properties of a water-lain sediment body is disclosed. The method comprises (a) determining the three-dimensional shape of at least part of the sediment body, (b) determining the flow field that deposited the sediment body from the shape of the body, and (c) using the determined flow field and associated simulated deposit to solve for the sediment body properties in at least one point within the measured body.

A second embodiment of the method to determine the internal properties of a water-lain sediment body is disclosed. The method comprises (a) determining the three-dimensional shape of at least part of the body and the location of the inlet through which the depositing flow was emitted, (b) calculating a reduced set of scaled properties of the flow that deposited the body from the shape of the body, (c) determining the scale factor and flow properties not in the reduced set. (d) using the calculated flow properties to calculate at least one property of the measured deposit in at least one location.

A third embodiment of the method to determine the internal properties of a water-lain sediment body is disclosed. The method comprises: (a) determining the shape of at least part of the body and the location of the inlet through which the depositing flow was emitted, (b) calculating scaled flow properties of the flow that deposited the body from the shape of the body, (c) identifying at least one characteristic curve of the scaled flow, (d) estimating the suspended sediment volume fractions in each grain size bin at the inlet by an iterative process, (e) determining the actual (unscaled) flow properties along at least one characteristic curve, (f) calculating the deposit thickness along at least one characteristic curve from the unscaled flow properties, (g) comparing the calculated deposit thickness to the actual deposit thickness along at least one characteristic curve, and repeating steps (d) through (g) until the calculated thickness and actual thickness are substantially similar, and (i) using the final calculated actual flow properties to determine at least one internal property of the sediment body in at least one point in the body.

DETAILED DESCRIPTION

In the following detailed description, the invention will be described in connection with its preferred embodiment. However, to the extent that the following description is specific to a particular embodiment or a particular use of the invention, this is intended to be illustrative only. Accordingly, the invention is not limited to the specific embodiment described below, but rather, the invention includes all alternatives, modifications, and equivalents falling within the true scope of the appended claims.

The present invention is a method for predicting properties of a sediment body from observation of the shape of the body. Specifically, the inventive method can be applied to finding the grain size distribution at every point within a water-lain sediment deposit using only the three-dimensional outline of the deposit.

The deposition of clastic sedimentary bodies typically begins with a flow of sediment-laden water from a confined channel, such as a river mouth, into an open region, such as a basin. The point where the sediment-laden flow enters an open region where deposition occurs is known as the inlet. Initially such flows expand freely and deposit sediment as the flow decelerates. Thereafter, as the deposited sediment grows in height, the deposited sediment begins to obstruct the flow field. Eventually, the deposit becomes sufficiently large that the flow is diverted around the deposit. This results in a new path leading to a new inlet where the flow is discharged to an open region beyond or adjacent to the old deposit. The deposition process then repeats, and a second sedimentary body in the system is created. In addition, more than one such body may be actively built within the system at a time. Overall, the process produces a deposit consisting of stacks of sedimentary bodies, which is a useful model for the structure of hydrocarbon reservoirs.

The flow characteristics which create such sedimentary bodies can be analyzed from the Navier-Stokes equations and conservation principles. A-vertically-averaged version of these equations can be used to describe a sediment laden flow beneath stationary clear water that can be entrained (e.g., Parker, 1986). One example of such a two-layer flow is a turbidity current in the deep ocean. Such analyses can be extended to flows without vertical entrainment, such as a shallow water layer under air, and these extensions are also within the scope of the present invention.

Applicants recognized that applying reasonable assumptions to these principles facilitates an analysis procedure, providing a physical and empirical principle-based quantification of the characteristics of fluid flow-deposited sand bodies. This relationship between fluid flow principles and sedimentary body characteristics facilitates a method for characterizing the properties of a deposit based on only a minimum amount of initially available data. That method, in its various embodiments, is the subject of the present invention.

The inventive method utilizes an assumption that the grains which compose the deposit are carried and deposited by a sediment-laden fluid flow with height $h(x,y)$, x-velocity $u(x,y)$, and y-velocity $v(x,y)$. The fluid flow contains a volume fraction $C_i(x,y)$ of grains of the ith grain size. The grains in the ith grain size bin all have a characteristic diameter of $d_i$ and fall through still water with a terminal velocity (also referred to as a settling velocity) $v_{si}$. Furthermore, the method is built on the assumption that the sediment, both in the flow and in the deposit, may be characterized by bins of a common nominal grain diameter. Each such bin may, for example, be characterized by a nominal diameter $d_i$ and include grains having an actual diameter ranging from 84% to 119% of $d_i$. However, the inventive method should work with other ranges. The time duration over which deposition persists to form the deposit is T, and the resulting deposit thickness is $z(x,y)$.

Figure 1:
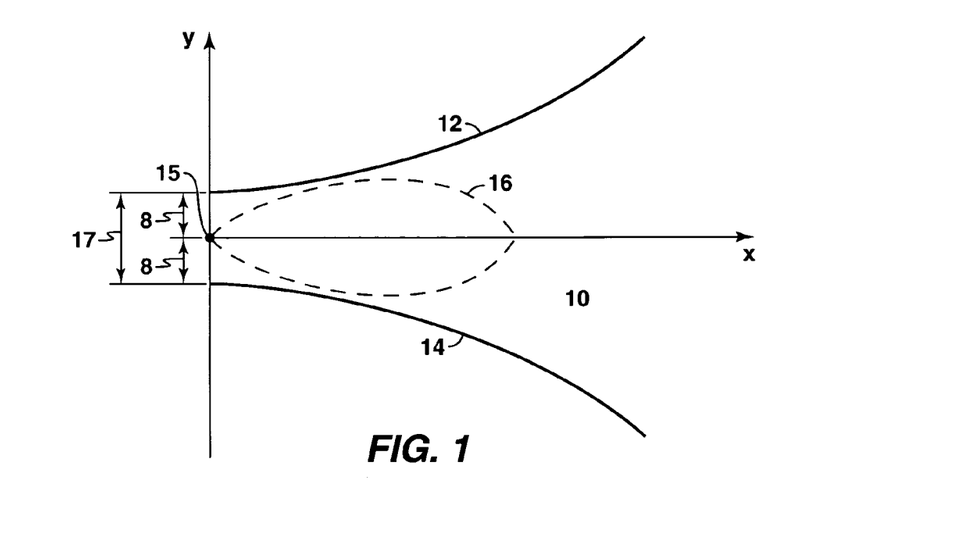
FIG. 1 is a plan view of a fluid flow which is depositing a sedimentary body, including the flow boundaries.
Figure 2:
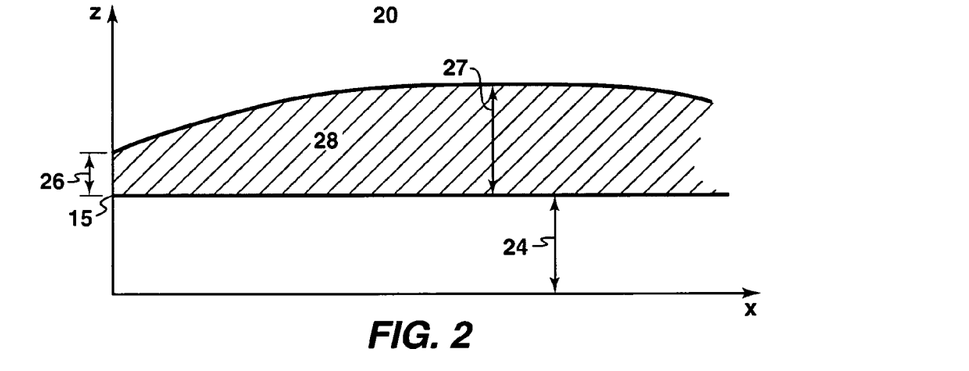
FIG. 2 is an elevation view corresponding to plan view FIG. 1.
Figure 3:
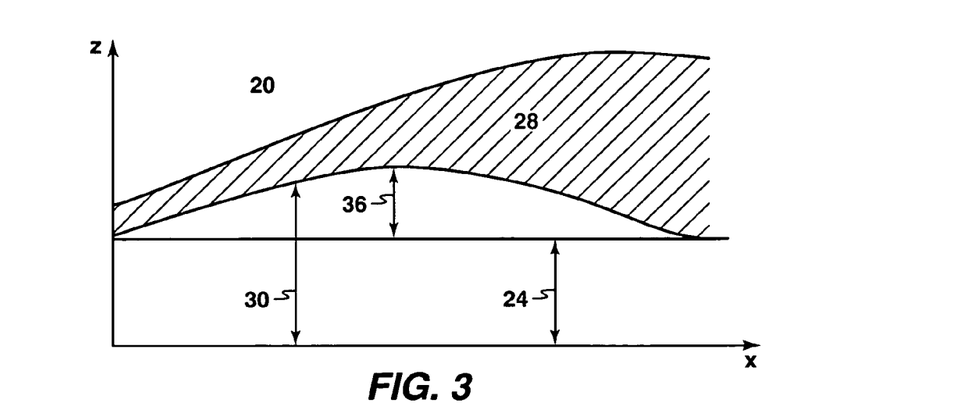
FIG. 3 is an elevation view corresponding to plan view FIG. 1 after deposition has occurred.

FIGS. 1, 2, and 3 depict the assumptions and parameters used in the present invention. FIG. 1 depicts a plan view of fluid flow 10 with flow boundaries 12 and 14. Inlet 15 for fluid flow 10 is centered, for convenience, at the origin of the x and y-axes, and flow emitted from the inlet moves initially in the positive x direction. At the inlet 15, the flow boundary has an initial width 17 and a half-width 8, and expands in the positive x direction. Also depicted is an outline of the deposit 16 formed by the flow.

FIG. 2 depicts an elevation view corresponding to plan view FIG. 1. The fluid inside the flow boundaries 12 and 14 of FIG. 1 is comprised of two layers. FIG. 2 illustrates the two layers of fluid as a clear layer 20 above a sediment-laden layer 28. The sediment-laden layer 28 is also referred to herein as the turbid water layer. The elevation of the bottom before the deposition process occurs is 24. The height of the sediment-laden water layer at inlet 15 is 26. The height of the sediment-laden water layer 28 may vary based on location, as illustrated by height 27 located at a different point further along the x-axis in FIG. 2.

FIG. 3 is an elevation view corresponding to the plan view of FIG. 1 after deposition has occurred. As in FIG. 2, the fluid flow in FIG. 3 is depicted as being comprised of clear layer 20 above a sediment-laden layer 28. The elevation of the bottom after deposition is 30. This elevation consists of the elevation of the original bottom 24 together with the thickness of the newly deposited sediment layer 36.

Table 1 provides a detailed list of the parameters used in the present method. As is indicated in Table 1, the height $h_0$ and velocity component $u_0$ of the sediment-laden layer at the inlet are assumed to be constant across the width of the inlet along the y-axis. The velocity component $u_0$ is also assumed to be constant vertically through the thickness of the flow. The inlet half-width b is also defined. Thereafter, based on the equations described herein, the height h and velocity components u and v of the turbid water layer are functions of position with respect to the x and y axes. Velocity components u and v are assumed to be constant over the depth of the sediment-laden layer. The sediment-laden layer is assumed to have a vertically-averaged sediment volume fraction $C_i$ of grains of the ith grain size bin. The vertically-averaged sediment volume fraction varies with x and y throughout the flow, but the vertical profile of sediment concentration in the flow is assumed to have a consistent functional form so that the volume fraction of grains at the bottom of the flow is $\gamma_0 C_i$.

The deposit, which is formed from the flow of the turbid water layer, is assumed to be the result of the net deposition from the flow. The net deposition rate from the flow of grains of the ith grain size is the difference between the deposition rate $D_i$ of grains of the ith grain size from the flow onto the bottom and the erosion rate $E_i$ of grains of the ith grain size from the bottom back into the turbid water layer. The deposition process varies with the sediment concentration, and the erosion process varies with the flow velocity and grain size distribution in the bottom, so the net deposition will also vary with x and y locations.

The modeling of the depositing flow can be performed if the boundary conditions are known. An outflow boundary condition is applied along the edges of the simulation region, except for the y-axis as seen in FIG. 1. Along the y-axis, a u=0 boundary condition is applied except at the inlet, where the boundary conditions are determined using the inventive method. Persons skilled in the art will recognize that other boundary conditions could be selected around the simulation region excluding the inlet, and other choices of non-inlet boundary conditions are within the scope of the invention.

In the present invention, both the thickness of the deposit z and the grain size distribution of the deposit $G_i$ are assumed to be a function of both the deposition $D_i$ and the erosion $E_i$ that occurs during the fluid flow process. In this model of the fluid flow process, deposition is assumed to be a function of the settling velocity $v_{si}$ of the grains in still water and the sediment volume fractions immediately above the bottom:

Deposition Rate: $D_i(x, y) = \gamma_0 C_i(x, y) v_{si}$ [1]

It is generally understood that the erosion that occurs during the fluid flow process follows a complicated, empirically derived, relationship to the velocity of the flow and the grain size distribution in the bottom. One such empirical erosion relationship is specified by Garcia and Parker (1991):

Erosion Rate:

$$E_i = \frac{\beta Z_i^5 v_{si} G_i}{1 + \beta Z_i^5 / 0.3},$$ [2a]

$$Z_i = \lambda \frac{u^*}{v_{si}} R_{pi}^{0.6} \left(\frac{d_i}{p_{50}}\right)^{0.2}$$ [2b]

$$R_{pi} = \frac{\sqrt{Rg d_i^3}}{v}.$$ [2c]

In these equations, the term, $$u^* = \sqrt{f(u^2 + v^2)},$$ [2d]

is a shear velocity which is a function of the magnitude of the local flow velocity and a drag coefficient $f \approx 0.001-0.025$ depending on the nature of the sediment being deposited. Typically $f=0.002$. The grain size distribution is $G_i$ and the grain diameter associated with the 50$^{th}$ percentile of grain size in the deposit is $p_{50}$. The parameter $\beta=1.3\times10^{-7}$ and $\lambda=1-0.288\sigma_\phi$ where $\sigma_\phi$ is the standard deviation of the grain size distribution in the logarithmic "phi" units familiar to geologists.

The flow field at all points can be computed if the boundary conditions, particularly the flow conditions at the inlet, are known. The term "flow field" is used to mean the flow velocity parameters $u(x,y)$ and $v(x,y)$, as well as the height of the sediment-laden layer $h(x,y)$ and sediment volume fractions $C_i(x,y)$. The flow equations may be derived from the Navier-Stokes equations and continuity equations for a sediment laden flow beneath stationary clear water, and are used because the shape and internal properties of a deposited body depend on the flow field that deposited the body. For the motion of a turbid water layer, Parker, et al. (1986), Imran, et al. (1998), and Bradford and Katopodes (1999) all derived an appropriate system of equations:

X-Momentum:
$$\frac{\partial hu}{\partial t} + \frac{\partial hu^2}{\partial x} + \frac{\partial huv}{\partial y} = -\frac{1}{2} Rg \frac{\partial C_T h^2}{\partial x} - Rgh C_T \frac{\partial A}{\partial x} - c_D u \sqrt{u^2 + v^2}$$ [3a]

Y-Momentum:
$$\frac{\partial hv}{\partial t} + \frac{\partial huv}{\partial x} + \frac{\partial hv^2}{\partial y} = -\frac{1}{2} Rg \frac{\partial C_T h^2}{\partial y} - Rgh C_T \frac{\partial A}{\partial y} - c_D v \sqrt{u^2 + v^2}$$ [3b]

Sediment Conservation:

$$\frac{\partial hC_i}{\partial t} + \frac{\partial huC_i}{\partial x} + \frac{\partial hvC_i}{\partial y} = E_i - D_i$$ [3c]

Fluid Conservation:

$$\frac{\partial h}{\partial t} + \frac{\partial hu}{\partial x} + \frac{\partial hv}{\partial y} = e_w \sqrt{u^2 + v^2}$$ [3d]

Deposit elevation:

$$A(x, y, T) = A(x, y, 0) + \frac{1}{1-\phi} \int_0^T \sum_i (D_i(x, y, t) - E_i(x, y, t)) dt$$ [3e]

Grain Size Distribution in Deposit:

$$G_i(x, y, t) = \frac{D_i(x, y, t) - E_i(x, y, t)}{\sum_i (D_i(x, y, t) - E_i(x, y, t))}$$ [3f]

The thickness of the deposit $z(x,y)$ is the difference between the elevation at time T and at time 0. The multiplier term on the right hand side of the fluid conservation equation (3d) is, $$e_w = \frac{0.00153}{0.0204 + F_r^{-2}},$$ [4]

and will be recognized to those skilled in the art as an entrainment coefficient often given the symbol $e_w$. Persons skilled in the art will recognize other variations of this term that are also within the scope of this invention. This term is an empirical function of the local Froude number at each point in the flow. The Froude number is, $$F_r = \sqrt{\frac{u^2 + v^2}{Rgh C_T}}.$$ [5]

As indicated, equations 3a–3f may be derived from the Navier-Stokes and continuity principles for a sediment-laden flow beneath stationary clear water. Persons skilled in the art with the benefit of the disclosures herein will recognize other equations could be used to calculate the flow properties. All such equations are intended to be within the scope of this invention. Certain assumptions may be made in using these equations to determine the flow field in the present invention. These assumptions include: 1) that the sediment-laden portion of the flow may be assumed to have at each x,y location, a uniform velocity and consistent sediment concentration profile vertically through its thickness, and 2) that the flow field may be assumed to be a constant across the entire width of the inlet, expressed in the following boundary conditions:

$$u(0, y) = \begin{cases} u_0 & |y| \leq b \\ 0 & |y| > b \end{cases},$$ [6a]

$$h(0, y) = h_0 |y| \leq b,$$ [6b]

$$C_i(0, y) = C_{i0} |y| \leq b.$$ [6c]

Significant computational time is required to calculate solutions to the time-varying equations. A time-saving approximation can be made by assuming that while the deposit is building, the flow field is in steady-state, so that the time derivatives in Equations 3a–3d are zero:

X-Momentum:

$$\frac{\partial}{\partial x}(hu^2) + \frac{\partial}{\partial y}(huv) = -\frac{1}{2}Rg\frac{\partial C_T h^2}{\partial x} - RghC_T\frac{\partial A}{\partial x} - c_D u\sqrt{u^2+v^2} \quad [7a]$$

Y-Momentum:

$$\frac{\partial}{\partial x}(huv) + \frac{\partial}{\partial y}(hv^2) = -\frac{1}{2}Rg\frac{\partial C_T h^2}{\partial y} - RghC_T\frac{\partial A}{\partial y} - c_D v\sqrt{u^2+v^2} \quad [7b]$$

Sediment Conservation:

$$\frac{\partial huC_i}{\partial x} + \frac{\partial hvC_i}{\partial y} = E_i - D_i \quad [7c]$$

Fluid Conservation:

$$\frac{\partial hu}{\partial x} + \frac{\partial hv}{\partial y} = e_w\sqrt{u^2+v^2} \quad [7d]$$

Deposit elevation:

$$A(x,y,T) = A(x,y,0) + \frac{T}{1-\phi}\sum_i (D_i(x,y) - E_i(x,y)) \quad [7e]$$

Grain Size Distribution in Deposit:

$$G_i(x,y) = \frac{D_i(x,y) - E_i(x,y)}{\sum_i (D_i(x,y) - E_i(x,y))} \quad [7f]$$

This steady-state assumption means the flow velocities, heights, and sediment volume fractions of the sediment-laden layer at each x and y location are constant throughout the deposition time T. The deposit which results has a constant grain size distribution $G_i$ through the depth of the deposit, but that distribution can vary with x and y location throughout the deposit. The result of the deposition process after deposition time T is a deposit whose thickness z varies with x and y. It is assumed that deposition persists for deposition time T, and that the flow is uninfluenced by the growing body it deposits until time T.

Equations 7c and 7f each apply to every simulated grain size bin. Furthermore, at the inlet, sediment volume fractions must be specified for every grain size bin in the system, as expressed in Equation 6c. A modified form of Equations 7a–7d will now be derived which treat the total suspended sediment in the system as a whole, rather than treating each separate size bin independently. This modification will prove useful in simplifying the process of determining the inlet conditions of the flow. Equation 7c may be summed over all grain size bins, and the result of equation 7e may be used to produce equation 8, Sediment Conservation:

$$\frac{\partial huC_T}{\partial x} + \frac{\partial hvC_T}{\partial y} = -z\left(\frac{1-\phi}{T}\right). \quad [8]$$

A scale factor is defined as, $$\alpha = \left[\frac{T}{(1-\phi)}\right]^{1/3}, \quad [9]$$

and the following scaled variables are defined, $U = \alpha u$ $V = \alpha v$ $$K_T = \alpha^2 C_T \quad [10]$$

Equations 7a–7d can then be written, with Equation 8 replacing Equation 7c,

X-Momentum:

$$\frac{\partial}{\partial x}(hU^2) + \frac{\partial}{\partial y}(hUV) = -\frac{1}{2}Rgh^2\frac{\partial K_T}{\partial x} - \quad [11a]$$
$$RghK_T\left(\frac{\partial h}{\partial x} + \frac{\partial A}{\partial x}\right) -$$
$$c_D U\sqrt{U^2+V^2}$$

Y-Momentum:

$$\frac{\partial}{\partial x}(hUV) + \frac{\partial}{\partial y}(hV^2) = -\frac{1}{2}Rgh^2\frac{\partial K_T}{\partial y} - \quad [11b]$$
$$RghK_T\left(\frac{\partial h}{\partial y} + \frac{\partial A}{\partial y}\right) -$$
$$c_D V\sqrt{U^2+V^2}$$

Sediment Conservation:

$$\frac{\partial hUK_T}{\partial x} + \frac{\partial hVK_T}{\partial y} = -z \quad [11c]$$

Fluid Conservation:

$$\frac{\partial hU}{\partial x} + \frac{\partial hV}{\partial y} = e_w\sqrt{U^2+V^2} \quad [11d]$$

In Equation 11c, the shape of the deposit z(x,y) has become the forcing function or right-hand side, and the deposition and erosion equations (1 and 2) for each grain size bin no longer appear. Furthermore, the number of necessary inlet boundary conditions has been reduced so that only $U_0$, $h_0$, and $K_{T0}$ need to be specified.

As will be understood by persons skilled in the art, fluid flow systems are often preferably analyzed using a characteristic curve coordinate system. Characteristic curve expressions for the sediment volume equations will prove useful in determining the sediment size distribution at the inlet of the flow. Such analysis begins with the definition of the characteristic curve relationships. In this case, $$\frac{dx}{ds} = hU \quad \frac{dy}{ds} = hV, \quad [12]$$

where s is the characteristic curve parameter.

In this coordinate system, the sediment mass conservation equation 7c becomes,

Sediment Mass Conservation $\frac{dC_i}{ds} = \alpha[(E_i - D_i) - C_i e_w\sqrt{u^2+v^2}]$. [13]

Figure 4:
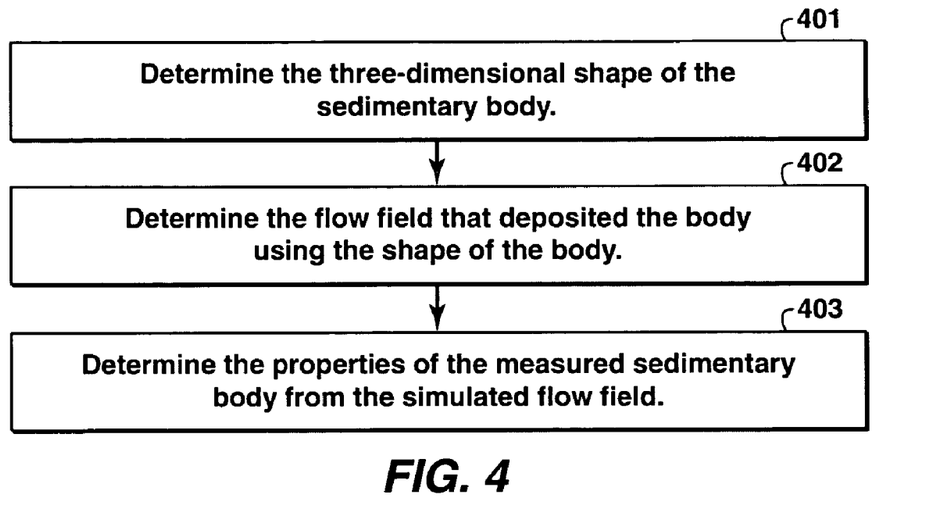
FIG. 4 is a flow chart of a first embodiment of the invention.

One embodiment will now be described. As shown in FIG. 4, this embodiment comprises: determining at least part of the three-dimensional shape of a sedimentary body (step 401), determining the flow field that built the deposit from the shape of the deposit (step 402), and determining deposit properties within the measured body based on the determined flow field (step 403). The flow field properties associated with the sediment body include, for example, flow velocity, suspended sediment volume fractions within at least one grain size bin, deposition time, and flow height. The properties of the water-lain sediment body include, in addition to the flow properties associated with deposition of the sediments, for example, the thickness of the sediment body, the size of the body, the shape of the body, the grain size distribution at points within the body, as well as other properties of the body, such as bedding type, which are not explicitly modeled, but correlate in known ways the modeled flow or deposit properties. The process will be described in more detail in the following paragraphs.

Step 401 is to determine the three-dimensional shape of the deposit, which involves specifying at least the thickness of the deposit at all points within a mapview region of the deposit, and optionally specifying the topography of the surface below the deposit. The location of the inlet which supplied substantially all the sediment contained within the body would also be determined. In practice, this information is typically obtained from a three-dimensional seismic image of the sedimentary body. This information may also be obtained from correlating well logs and/or cores.

Step 402 is to determine the flow field that built the deposit from the shape of the deposit. One method for accomplishing this is described in steps 502–503 below. An alternative method is described here. An estimate is made of the inlet conditions associated with the flow which built the measured deposit. The flow and associated deposit may be simulated based on the estimated inlet conditions. The estimate of the inlet conditions is refined until the shape of the resulting simulated deposit substantially resembles the shape of the measured deposit.

The estimate of the inlet conditions of Step 402 is further elaborated here. The inlet conditions are the variables specified in Equations 6a–6c and the total time T during which deposition persists. In this embodiment, the inlet conditions are assumed to be constant over time, but time-varying inlet conditions may also be applied within the scope of this invention, provided the time history of flow at the inlet can be determined, as by empirical studies of analogous systems.

In real deposits, only certain ranges of inlet conditions are likely, and the various flow properties at the inlet tend to be correlated. For example, fast flows tend to be higher and to carry coarser sediments than slower flows. Knowledge about ranges of inlet conditions and correlations between properties can be obtained from empirical studies and from theoretical calculations and can be used to constrain the choice of inlet conditions, reducing the number of iterations required to converge on the best estimate of inlet conditions.

The simulation of the flow field and associated deposit of Step 402 is further elaborated here. The simulation of the flow field and associated deposit based on the inlet condition estimate may be accomplished by numerical solution of time-varying Equations 3a–3f, running forward in time until a stopping criterion is reached. The stopping criterion could be that the deposited sediment volume in the simulation matches the volume of the measured deposit. Alternatively, the stopping criterion could be that the thickness of the simulated deposit matches the thickness of the measured deposit in at least one specified point. Other stopping criteria are also within the scope of this invention. The simulation may also be accomplished by numerical solution of the steady-state Equations 7a–7f. To calculate the outline of the deposit, the total deposition time T must be determined, and this determination can be based on making the simulated deposit volume equal the measured deposit volume, making the simulated and measured deposits match in thickness for at least one location, or other criteria.

The refinement of the inlet condition estimate of Step 402 is further elaborated here. A variety of methods could be selected for determining whether the three-dimensional shape of the simulated deposit is substantially similar to the three-dimensional shape of the measured deposit. For example, the degree of similarity between the simulated and measured deposits can be found by pointwise comparison of thicknesses at specified locations. The sum of the squared thickness errors can then be used as a single error metric. The problem of selecting updated inlet properties until the minimum of the error metric is found can be solved with various techniques familiar to persons of ordinary skill in the art, including but not limited to, gradient descent methods and simulated annealing.

Step 403 is to assign each deposit property at each point of interest in the measured deposit the same value as the deposit property at the corresponding point of the simulated deposit.

Figure 5:
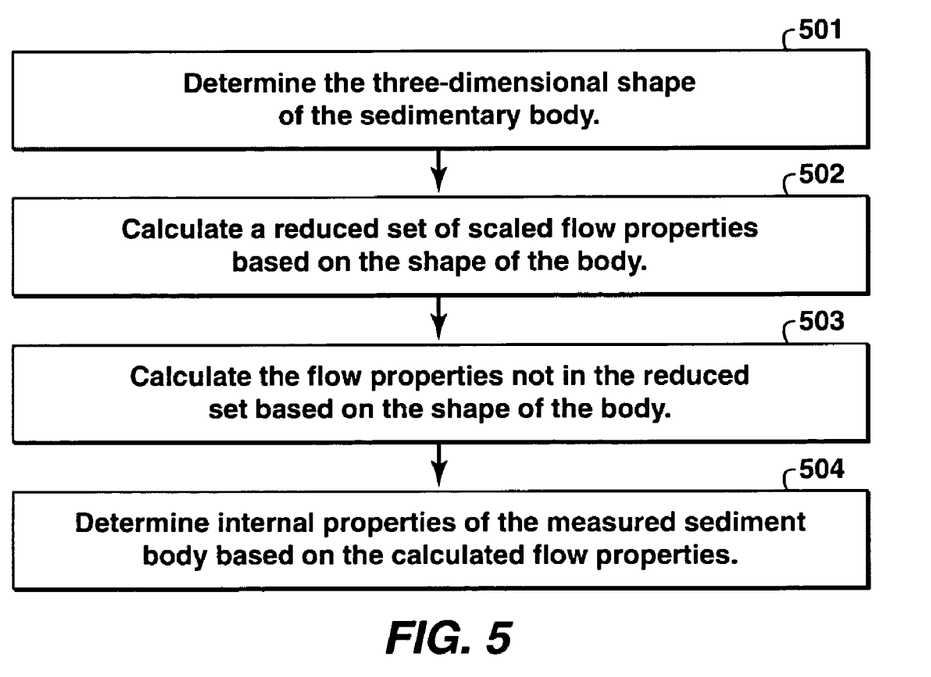
FIG. 5 is a flow chart of a second embodiment of the invention.

Another embodiment will now be described. This embodiment contains a two-part method for establishing the flow field, where a reduced set of scaled flow field properties are determined first, then the scale factor and remaining flow field properties are determined. As illustrated in FIG. 5, the three-dimensional shape of the body is determined (step 501). The shape of the body is used to determine a reduced set of scaled flow field properties (step 502). The reduced set of scaled flow field properties together with the three-dimensional shape of the body are used to determine the scale factor and the remaining flow field properties not included in the reduced set (step 503). The full flow field is then used to determine at least one property of the sedimentary body in at least one point (step 504). The scaled reduced set of flow properties include, for example, the flow height, the flow velocity components multiplied by a scale factor, and the total sediment volume fraction multiplied by the squared scale factor, as given in equation 10. The scale factor can be, for example, the third root of the deposition time divided by one minus the porosity, as given in equation 9. The remaining flow field properties then include, for example, the sediment volume fractions in each grain size bin, as the total sediment volume fraction was included in the reduced set of flow properties, but the division of that sediment among the grain size bins was not. The properties of the water-lain sediment body include, in addition to the flow properties associated with deposition of the sediments, for example, the thickness of the sediment body, the size of the body, the shape of the body, the grain size distribution at points within the body, as well as other properties of the body, such as bedding type, which are not explicitly modeled, but correlate in known ways with the modeled flow or deposit properties. The process will be described in more detail in the following paragraphs.

Step 501 is to determine the three-dimensional shape of the deposit, which involves specifying at least the thickness of the deposit at all points within a mapview region of the deposit, and optionally specifying the topography of the surface below the deposit. The location of the inlet which supplied substantially all the sediment contained within the body would also be determined. In practice, this information is typically obtained from a three-dimensional seismic image of the sedimentary body. This information may also be obtained from correlating well logs and/or cores.

Step 502 is to calculate the reduced set of scaled flow field properties (U, V, h, and $K_T$). One method for making this calculation is to estimate U, V, h, and $K_T$ at the inlet, solve the system of partial differential equations in Equations 11a–11d, and repeat this process iteratively until the correct set of inlet conditions is found. A criterion must be established for determining when the correct set of inlet conditions has been found. One such criterion requires that $K_T \geq 0$ throughout the simulation region and seeks to minimize the path integral of $K_T$ along the back and side edges of the simulation region. Another criterion requires that $K_T \geq 0$ throughout the simulation region and that $K_T$ has a constant value along the contour of constant deposit thickness which is furthest from the inlet. Other criteria for determining when the correct set of inlet conditions have been found are also within the scope of this invention.

Persons skilled in the art will recognize there are a variety of numerical methods which can be used to solve Equations 11a–11d. One example is the control volume method (Patankar, 1980). All methods that can be used to solve these flow equations are intended to be within the scope of this invention.

Step 503 is to determine those flow field properties which are not included in the reduced set of properties found in step 502, typically the size distribution of grains in the flow and the scaling factor which is a function of the total deposition time. One method for accomplishing this step using the characteristic curves of the scaled flow field is described in steps 603–607 below.

Step 504 is to use the calculated flow field to determine properties of the measured sediment body. An example of one property of the sediment body is the grain size distribution at each location in the body $G_i(x,y)$, which may be calculated from the deposition and erosion rates associated with the flow field according to Equation 3f for the time-varying case or 7f for the steady-state case. The other properties may similarly be predicted from the disclosed equations and/or through commonly-known modeling techniques based on the relationships disclosed in this patent. The mapping of properties from the simulated deposit to the measured deposit can be accomplished by using the same coordinate system to represent both deposits, where the inlet is at the origin, and the positive x-axis proceeds in the direction of the flow at the inlet.

Figure 6:
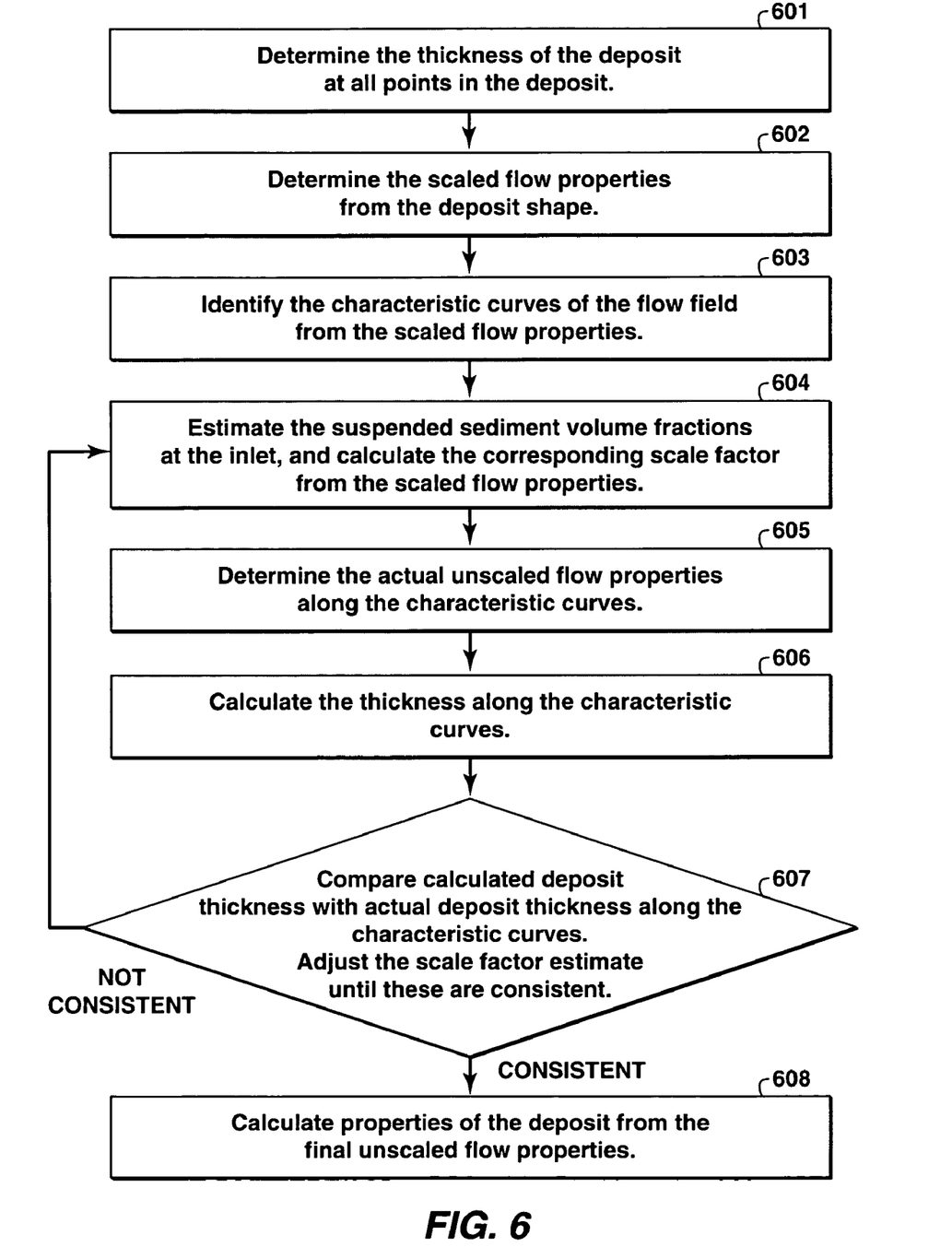
FIG. 6 is a flow chart of a third embodiment of the invention.

A third embodiment of the present invention will now be described. With reference to FIG. 6, this embodiment involves identifying the outline of the sedimentary body, solving for the flow field over that body, and then using the flow information to determine properties of the body. The three-dimensional outline or shape of the sedimentary body is determined by specifying the thickness throughout the deposit. The inlet location is also noted (step 601). The scaled flow field is determined from the shape of the deposit (step 602). At least one characteristic curve of the flow field is identified (step 603). The suspended sediment volume fractions for each grain size bin at the inlet $C_{iO}$ are estimated, with the estimate being refined through an iterative process (step 604). The scaled flow properties are unscaled based on the scale factor implicitly determined in step 604 to form an estimate of the actual unscaled flow properties (step 605). The deposit thickness is calculated along at least one characteristic curve based on the estimate of the unscaled flow properties (step 606). The calculated deposit thickness along the characteristic curves is compared with the actual deposit thickness along the same curves. If necessary, the estimate of the suspended sediment volume fractions at the inlet in step 604 is updated, and steps 604 through 607 are repeated until the calculated and measured thicknesses are substantially similar (step 607). Using the best estimate of the unscaled flow properties, as established in step 607, the deposit properties are calculated (step 608). This embodiment will be discussed in more detail in the following paragraphs. Persons skilled in the art based on the disclosure herein will recognize variations of this embodiment of this invention.

Step 601 is to determine the three-dimensional shape of the deposit, which involves specifying at least the thickness of the deposit at all points within a mapview region of the deposit, and optionally specifying the topography of the surface below the deposit. The location of the inlet which supplied substantially all the sediment contained within the body is also determined. In practice, this information is typically obtained from a three-dimensional seismic image of the sedimentary body. This information may also be obtained from correlating well logs and/or cores.

Step 602 is to calculate the reduced set of scaled flow field properties (U, V, h, and $K_T$). One method for making this calculation is to estimate U, V, h, and $K_T$ at the inlet, solve the system of partial differential equations in Equations 11a–11d, and repeat this process iteratively until the correct set of inlet conditions is found. A criterion must be established for determining when the correct set of inlet conditions has been found. One such criterion requires that $K_T \geq 0$ throughout the simulation region and seeks to minimize the path integral of $K_T$ along the back and side edges of the simulation region. Another criterion requires that $K_T \geq 0$ throughout the simulation region and that $K_T$ has a constant value along the contour of constant deposit thickness which is furthest from the inlet. Other criteria for determining when the correct set of inlet conditions have been found are also within the scope of this invention.

Step 603 is to determine at least one characteristic curve of the scaled flow field. The characteristic curves are defined by Equation 12. Note that the path of the characteristic curves is independent of the value of the scale factor. The characteristic curves for the flow field may be found by selecting a set of points at constant distance from the inlet but at regularly spaced angles from the inlet, and integrating Equation 12 using the flow properties of step 602.

Step 604 is to estimate the suspended sediment volume fraction in each grain size bin at the inlet, $C_{iO}$. This estimate is then refined by the iterative process described in the subsequent steps. Based on the choice of $C_{iO}$ and the value of $K_T$ at the inlet, as found in step 602, Equation 10 is used to determine the scale factor $\alpha$, defined in equation 9.

Step 605 is to determine the unscaled flow properties. The unscaled flow velocities (u, v) may be calculated from the scaled flow velocities (U, V) according to Equation 10, using the scale factor determined in step 604. The suspended sediment volume fractions at each point along the characteristic curves are then calculated by integrating Equation 13 along the characteristic curves, beginning at the inlet.

Step 606 is to use the unscaled flow properties to calculate the thickness of the deposit along at least one characteristic curve identified in step 603. This may be accomplished by solving equation 7e using the unscaled flow properties determined in step 605.

Step 607 is to compare the calculated deposit thickness from step 606 with the actual deposit thickness. The estimate of $C_{iO}$ in step 604 is then adjusted and steps 604–607 are repeated until the calculated deposit thickness is substantially equal to the measured deposit thickness.

Step 608 is to use the calculated flow field to determine properties of the measured sediment body. An example of one property of the sediment body is the grain size distribution at each location in the body $G_i(x,y)$, which may be calculated from the deposition and erosion rates associated with the flow field according to Equation 3f for the time-varying case or 7f for the steady-state case. The other properties may similarly be predicted from the disclosed equations and/or through commonly-known modeling techniques based on the relationships disclosed in this patent. The mapping of properties from the simulated deposit to the measured deposit can be accomplished by using the same coordinate system to represent both deposits, where the inlet is at the origin, and the positive x-axis proceeds in the direction of the flow at the inlet.

TABLE 1

| Parameter | Numeric Reference in FIGS. | Definition Of Parameter |
|---|---|---|
| b | 8 | Half-width of the inlet. The inlet is loacted at x = 0 and y between b and −b. |
| $h_0$ | 26 | Height of the sediment-laden layer at the inlet, constant across the width of the inlet. |
| $u_0$ | | Velocity of the sediment-laden layer out from the inlet. The flow is assumed to be in positive x direction, and the velocity is assumed to be constant laterally across the width of the inlet and vertically through the height of the flow. |
| $C_{i0}$ | | Volume fraction of the sediment-laden layer at the inlet consisting of sediment in the ith grain size bin. |
| $C_{T0}$ | | Total volume fraction of sediment in the sediment-laden layer at the inlet. This is the sum of $C_{i0}$ over all grain size bins i. |
| h(x,y) | 27 | Height of the sediment-laden water layer. |
| u(x,y) | | x-velocity component of the sediment-laden layer water layer. |
| v(x,y) | | y-velocity component of the sediment-laden layer water layer. |
| U(x,y) | | Scaled x-velocity, $U = \alpha u$ |
| V(x,y) | | Scaled y-velocity, $V = \alpha V$ |
| T | | Time during which the deposit is built before it diverts the flow. |
| A(x,y,t) | | Time dependent elevation of the bottom. |
| A(x,y,0) | 24 | Elevation of the bottom before deposition. |
| A(x,y,T) | 30 | Elevation of the bottom after deposition for time period T. |
| $C_i$(x,y) | | Volume fraction of the sediment-laden layer water layer consisting of sediment in the ith grain size bin. |
| $C_T$(x,y) | | Total volume fraction of the sediment-laden layer water layer consisting of sediment. This is the sum of Ci(x,y) over all grain size bins. |
| $K_T$(x,y) | | Scaledtotal sediment volume fraction, $K_T = \alpha^2 C_T$ |
| $G_i$(x,y) | | Grain size distribution in the deposit. Sum of $G_i$ over all i is 1. |
| $E_i$(x,y) | | Erosion rate for the ith grain size bin |
| $D_i$(x,y) | | Deposition rate for the ith grain size bin |
| $d_i$ | | Grain diameter of the ith grain size bin |
| $d_{50}$(x,y) | | Media grain diameter. |
| $v_{Si}$ | | Settling velocity of grains of diameter $d_i$ in still water |
| R | | Ratio of the density difference between the sediment and water to the density of water |
| φ | | Porosity of the deposit. May be assumed typically to be 0.4 |
| g | | Gravitational constant, 9.8 m/s² |
| $e_w$ | | Entrainment coefficient. |
| f | | Drag coefficient for erosion, typically 0.002. |
| $c_D$ | | Bottom frag coefficient for flow, typically 0.002. |
| v | | Kinematic viscosity of water. May be assumed to be 0.01 cm²/s. |
| s | | Parameter expressing location along the characteristic curve of the flow. |
| $F_r$ | | Froude number |
| $R_{pi}$ | | Perticle Reynolds number. |
| z(x,y) | 36 | Thickness of deposit resulting from seposition |
| α | | Scale Factor |
| $\gamma_0$ | | A constant assumed typically to be 2. |

We claim:

1. A method to determine the properties of a water-lain sediment body from the shape of the body comprising:
   (a) determining the three-dimensional outline of at least one region of a measured deposit and the location of the sedimentary body inlet through which the depositing flow was emitted;
   (b) determining the flow field that produced the sediment body, using the shape of at least one region of the sediment body to constrain the flow field estimate; and
   (c) determining properties of the measured sediment body from the determined flow field.

2. The method of claim 1 wherein the properties of a water-lain sediment body are selected from the group consisting of: thickness of the body, size of the body, shape of the body, grain size distribution at points within the body, flow velocity above the body, suspended sediment volume fractions above the body, deposition time, flow height above the body, inlet flow conditions, bedding type and any combination thereof.

3. The method of claim 1 wherein the flow field properties are selected from the group consisting of: flow velocity, suspended sediment volume fractions in at least one grain size range, deposition time, flow height and any combination thereof.

4. The method of claim 1 wherein a system of partial differential equations is used to determine the flow from the deposit shape by incorporating the deposit thickness as a forcing term of a total suspended sediment volume fraction equation.

5. The method of claim 1 wherein an iterative process is used to determine the flow properties from the deposit shape.

6. The method of claim 1 further comprising simulating the flow and associated deposit based on an estimate of the inlet conditions which built the sediment body and using the simulated deposit with the flow field to determine properties of the measured sediment body.

7. The method of claim 6 further comprising refining the flow field of the simulated deposit until the shape of the simulated deposit substantially resembles the shape of the measured deposit.

8. A method to determine properties of a water-lain sediment body from the three-dimensional shape of the body, comprising:
   (a) determining the three-dimensional outline of at least one region within the body and the location of the inlet through which the depositing flow was emitted;
   (b) calculating a reduced set of scaled properties of the flow that deposited the body from the three-dimensional outline of at least one region of the sedimentary body;
   (c) calculating the scale factor and the flow properties not included in the reduced set of properties; and
   (d) use the flow properties to calculate at least one internal property of the sediment body in at least one location.

9. The method of claim 8 wherein the properties of a water-lain sediment body are selected from the group consisting of: thickness of the body, size of the body, shape of the body, grain size distribution at points within the body, flow velocity above the body, suspended sediment volume fractions above the body, deposition time, flow height above the body, inlet flow conditions, bedding type and any combination thereof.

10. The method of claim 8 wherein the flow field properties are selected from the group consisting of: flow velocity, suspended sediment volume fractions in at least one grain size range, deposition time, flow height and any combination thereof.

11. The method of claim 8 wherein a system of partial differential equations is used to determine scaled flow properties from the deposit shape by means of incorporating the deposit thickness in the forcing term of a total suspended sediment volume fraction equation.

12. The method of claim 8 wherein an iterative process is used to determine the scale factor.

13. A method to determine properties of a water-lain sediment body from the shape of the body, comprising:
 (a) determining the thickness of the sedimentary body throughout at least one region of the body and determining the location of the inlet through which the depositing flow was emitted,
 (b) calculating scaled flow properties of the flow that deposited the body based on the thickness of the body,
 (c) identifying at least one characteristic curve of the scaled flow properties,
 (d) estimating the suspended sediment volume fractions at the inlet and then calculating the corresponding scale factor associated with the flow properties,
 (e) determining the unscaled flow properties along at least one characteristic curve from the corresponding scale factor,
 (f) calculating the deposit thickness along at least one characteristic curve,
 (g) comparing the calculated deposit thickness to the actual deposit thickness along at least one characteristic curve, and repeating steps (d) through (g) until the calculated thickness and actual thickness are substantially similar, and
 (h) using the final calculated flow properties to determine at least one internal property of the sediment body in at least one point in the body.

14. The method of claim 13 wherein the properties of a water-lain sediment body are selected from the group consisting of: thickness of the body, size of the body, shape of the body, grain size distribution at points within the body, flow velocity above the body, suspended sediment volume fractions above the body, deposition time, flow height above the body, inlet flow conditions, bedding type and any combination thereof.

15. The method of claim 13 wherein the flow field properties are selected from the group consisting of: flow velocity, suspended sediment volume fractions in at least one grain size range, deposition time, flow height and any combination thereof.

16. The method of claim 13 wherein a system of partial differential equations is used to determine scaled flow properties from the deposit shape by means of incorporating the deposit thickness in the forcing term of a total suspended sediment volume fraction equation.

17. The method of claim 4 wherein the correct inlet conditions for the system of partial differential equations are determined by requiring that the scaled suspended sediment concentration cannot be less than zero within the simulation region and minimizing the scaled suspended sediment concentration in at least one point on the edge of the simulation region.

18. The method of claim 11 wherein the correct inlet conditions for the system of partial differential equations are determined by requiring that the scaled suspended sediment concentration cannot be less than zero within the simulation region and minimizing the scaled suspended sediment concentration in at least one point on the edge of the simulation region.

19. The method of claim 16 wherein the correct inlet conditions for the system of partial differential equations are determined by requiring that the scaled suspended sediment concentration cannot be less than zero within the simulation region and minimizing the scaled suspended sediment concentration in at least one point on the edge of the simulation region.

* * * * *